US007200805B2

(12) United States Patent
Carlson et al.

(10) Patent No.: US 7,200,805 B2
(45) Date of Patent: Apr. 3, 2007

(54) DYNAMIC GENERATION OF SCHEMA INFORMATION FOR DATA DESCRIPTION LANGUAGES

(75) Inventors: Brent A. Carlson, Rochester, NY (US); Dave H Gross, Rochester, NY (US); Timothy J Graser, Rochester, MN (US)

(73) Assignee: LogicLibrary, Inc., Oakmont, PA (US)

( * ) Notice: Subject to any disclaimer, the term of this patent is extended or adjusted under 35 U.S.C. 154(b) by 615 days.

(21) Appl. No.: 10/102,189

(22) Filed: Mar. 19, 2002

(65) Prior Publication Data

US 2004/0205573 A1  Oct. 14, 2004

(51) Int. Cl.
    *G06F 17/00* (2006.01)
(52) U.S. Cl. .................................. 715/513
(58) Field of Classification Search ........... 715/513, 715/531; 707/100; 717/143
    See application file for complete search history.

(56) References Cited

U.S. PATENT DOCUMENTS

| 5,361,355 | A | 11/1994 | Kondo et al. |
| 5,446,575 | A | 8/1995 | Lysakowski, Jr. |
| 5,980,096 | A | 11/1999 | Thalhammer-Reyero |
| 6,023,702 | A | 2/2000 | Leisten et al. |
| 6,055,543 | A | 4/2000 | Christensen et al. |
| 6,067,548 | A | 5/2000 | Cheng |
| 6,092,075 | A | 7/2000 | Carey et al. |
| 6,134,706 | A | 10/2000 | Carey et al. |
| 6,154,738 | A | 11/2000 | Call |
| 6,202,205 | B1 | 3/2001 | Saboff et al. |
| 6,230,315 | B1 | 5/2001 | Nicholas |
| 6,289,501 | B1 | 9/2001 | Mutschler, III |
| 6,349,237 | B1 | 2/2002 | Koren et al. |
| 6,366,930 | B1 | 4/2002 | Parker et al. |
| 6,405,179 | B1 | 6/2002 | Rebane |
| 6,446,256 | B1 | 9/2002 | Hyman et al. |
| 6,560,569 | B1 * | 5/2003 | Abu El Ata .................... 703/2 |
| 6,678,882 | B1 | 1/2004 | Hurley et al. |
| 2001/0029604 | A1 | 10/2001 | Dreyband et al. |
| 2002/0158880 | A1 * | 10/2002 | Williams et al. ............ 345/582 |
| 2002/0169658 | A1 | 11/2002 | Adler |
| 2003/0037301 | A1 | 2/2003 | Rising, III |

OTHER PUBLICATIONS

XML Schema Parts 0-2, W3C Recommendation, May 2, 2001.*
Creating Extensible Content Models, Jun. 21, 2001□□http://www.xfront.com/ExtensibleContentModels.html.*
Frankston et al., "XML-Data Reduced" Jul. 3, 1998□□http://www.ltg.ed.ac.uk/~ht/XMLData-Reduced.htm□□.*
Ogbuji, "Validating XML with Schematron," Nov. 22, 2000□□http://www.xml.com/pub/a/2000/11/22/schematron.html.*
Cagle, "Schema Tricks and Tips", Aug. 21, 2001□□http://www.perfectxml.com/Conf/Wrox/Files/kurt_schema.html.*

\* cited by examiner

*Primary Examiner*—Stephen Hong
*Assistant Examiner*—Adam Queler
(74) *Attorney, Agent, or Firm*—Shumaker & Sieffert, P.A.

(57) ABSTRACT

In general, techniques are described for dynamically generating schema information for data description languages. The techniques include receiving a schema defining a class of elements that conform to a data description language, and receiving a constraint template that defines requirements for instances of the elements. The techniques further comprise dynamically generating schema information based on the schema and the constraint template, and validating a document in accordance with the schema information.

41 Claims, 4 Drawing Sheets

DYNAMIC GENERATION OF SCHEMA INFORMATION FOR DATA DESCRIPTION LANGUAGES

TECHNICAL FIELD

The invention relates to computing devices and, more particularly, to data description languages, such as the extensible markup language (XML), that are often used by computing devices when communicating data

BACKGROUND

The extensible markup language (XML) has recently emerged as a powerful language for describing and communicating data. In particular, XML is an open, text-based markup language that provides structural and semantic information to the data. XML is a subset of the popular Standard Generalized Markup Language (SGML), and has become widely used within the Internet.

An XML document includes a root element and, possibly, a number of child elements. Each element consists of an opening tag and a closing tag. The elements of a document must be nested in the closing tag for the child. In this manner, an XML document follows a tree structure in which the elements have parent-child relationships. For example, the following pseudocode illustrates the format of a conventional XML document:

```
<ROOT>
    <CHILD A>
        <CHILD A1> DATA </CHILD A1>
    </CHILD A>
    <CHILD B> DATA </CHILD B>
</ROOT>
```

An XML schema is used to define and describe a class of XML documents. More specifically, an XML schema uses schema components to define the meaning, usage and relationships of the elements that may be used within a class of XML documents, as well as permissible content, attributes, and values for the elements. The World Wide Web Consortium (W3C) XML Schema Definition Language, for example, is an XML language for describing and constraining the content of XML documents. Other example schema definition languages include Document Content Description for XML (DCD), Schema for Object-Oriented (SOX), Document Definition Markup Language (DDML), also referred to as XSchema, Regular Language description for XML Core (RELAX), Tree Regular Expressions for XML (TREX), Schematron (SCH), and Examplotron (EG).

The following pseudocode illustrates the format of a conventional XML schema:

```
</XSD:SCHEMA>
    <XSD:ELEMENT NAME="USED-CAR" MINOCCURS="0"
    MAXOCCURS="UNBOUNDED">
        <XSD:ELEMENT NAME="MODEL" TYPE="XSD:STRING"
        USE="REQUIRED"/>
```

-continued

```
        <XSD:ELEMENT NAME="YEAR" USE="REQUIRED">
            <XSD:ATTRIBUTE NAME="VALUE"
            TYPE="XSD:INTEGER"/>
        </XSD:ELEMENT>
    </XSD:ELEMENT>
</XSD:SCHEMA>
```

The above pseudocode illustrates some of the basic concepts supported by schema languages. For example, various elements can be defined, such as the elements USED-CAR, MODEL and YEAR defined above. In addition, basic constraints for the elements can be defined, such as whether the element or an attribute of the element is required, and a range for the number of occurrences for the element.

However, making use of schema languages to constrain the structure and content of the XML documents can lead to very complex schemas having a specific definition for each permissible element. For example, schema languages tend to require definition of specific elements within the schema in order to define constraints on the elements. This approach tends to cause the compliant XML documents to lose normalization. In other words, this approach can result in XML documents in which the names and attributes for the elements are significantly different.

SUMMARY

In general, the invention is directed to techniques for dynamically generating schema information for data description languages, such as the extensible markup language (XML).

More specifically, the techniques dynamically generate schema information by application of one or more constraint templates to a base schema. One or more definition templates may also be applied to extend the base schema as necessary to further define the valid types of elements. In this manner, complex schema information can be generated including requirements that constrain the use and relationships of the elements without requiring modification to the base schema.

In one embodiment, a method comprises receiving a schema defining a class of elements that conform to a data description language, and receiving a constraint template that defines requirements for instances of the elements. The method further comprises validating a document in accordance with the schema and the constraint template.

In another embodiment, a system comprises a schema defining a class of elements that conform to a data description language, and a constraint template that defines requirements for instances of the elements. The system further comprises a validation engine to validate a document in accordance with the schema and the constraint template.

In another embodiment, a system comprises a schema defining a class of elements that conform to a data description language, a definition template that defines a sub-class for the elements, and a constraint template that defines requirements for instances of the sub-class. The system further comprises a schema generator to generate a virtual schema based on the schema, the definition template, and the constraint template, and a validation engine to validate a document in accordance with the virtual schema.

In another embodiment, a computer-readable medium comprises instructions to cause a processor to receive a schema defining a class of elements that conform to a data description language, and receive a constraint template that defines requirements for instances of the elements. The medium further comprises instructions to dynamically generate schema information based on the schema and the constraint template.

In another embodiment, a system comprises a schema defining a class of elements that conform to a data description language, and a hierarchy of constraint templates having at least one parent constraint template and at least one child constraint template, wherein the constraint templates defines requirements for instances of the elements, and the requirements of the child constraint template limit the requirements of the parent constraint template.

The techniques described herein may offer one or more advantages. For example, the constraint templates and the definition templates conform to the data description language, e.g., XML, and can easily be created and modified. Accordingly, a user can define constraints for the elements of the schema without needing to modify the schema itself. Furthermore, a constraint template schema and a definition template schema can be used to control the structure and content of the templates. The templates created by the user can, therefore, be validated against their respective schemas to identify any errors within the templates. In this manner, the techniques reduce the chances of error in that users need not continually create or modify a schema in order to support new classes of XML documents.

In addition, the XML documents that comply with the base schema are normalized in the sense that the names and attributes of the elements are substantially similar. Accordingly, constraints can be introduced for fine-grain validation of XML documents without requiring a complex schema in which the documents lose their normalization.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
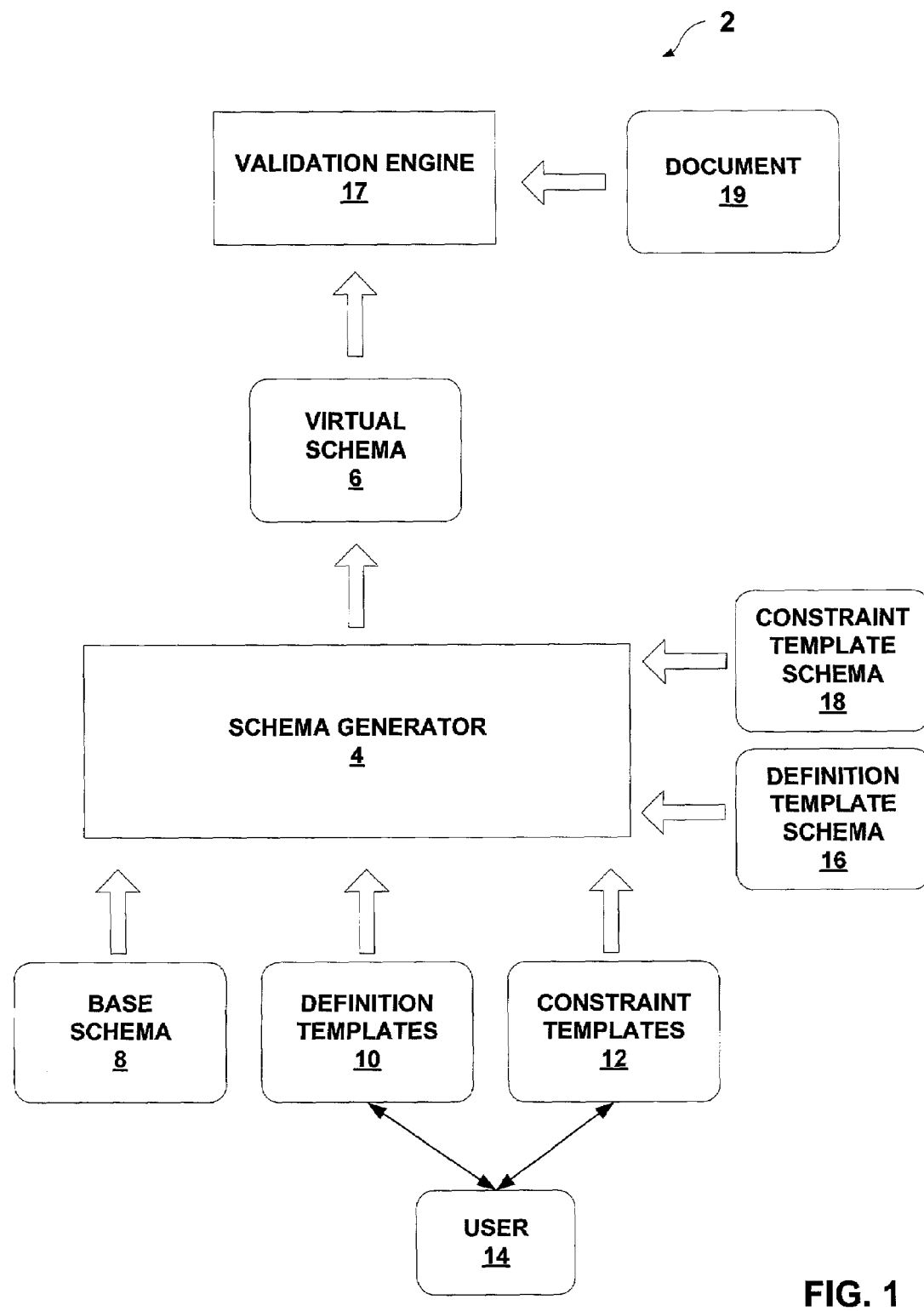
FIG. 1 is a block diagram illustrating an example system in which a schema generator dynamically generates schema information, referred to as a "virtual" schema.

FIG. 1 is a block diagram illustrating an example system 2 in which a schema generator 4 dynamically generates schema information, referred to as virtual schema 6. In particular, schema generator 4 generates virtual schema 6 in accordance with base schema 8, definition templates 10, and constraint templates 12.

Base schema 8 conforms to a schema definition language, and defines a class of elements that conform to a data description language, such as the extensible markup language (XML). In this manner, base schema 8 may remain static and need not be modified to support new XML documents.

To define classes of permissible XML documents, user 14 may create definition templates 10, constraint templates 12, or both. More specifically, the user may create one or more definition templates 10 that define sub-classes for the elements defined by base schema 8. In this manner, user 14 can extend the element definitions of base schema 8 without modifying base schema 8.

In addition, user 14 may create one or more constraint templates 12 that define requirements for instances of the elements. Constraint templates 12 may define requirements for instances of elements belonging to the classes defined by base schema 8, instances of elements belonging to the sub-classes defined by definition templates 10, or both. For example, constraint templates 12 may define a required cardinality for the instances of the elements, a required minimum or maximum number of the instances, a range for a required number of the instances of the elements, a required attribute for the instances, a required parameter value for the instances of the elements, specific required instances of the elements, and the like.

Schema generator 4 generates the schema information of virtual schema 6 by first generating a data structure representing the classes of elements defined by base schema 8. Schema generator 4 then applies definition templates 10 to base schema 8 to extend the schema information to include the sub-classes of elements defined within definition templates 10. Finally, schema generator 4 applies constraint templates 12 to update the schema information to include the restrictions defined by constraint templates 12.

Definition templates 10 and constraint templates 12 conform to the data description language to which the elements of base schema 8 comply, e.g., XML. Accordingly, user 14 can easily create and modify definition templates 10 and constraint templates 12, and need only modify base schema 8 in order to support new classes of XML documents 19.

Schema generator 4 validates definition templates 10 and constraint templates 12 created by user 14 against definition template 16 and constraint template schema 18, respectively. In this manner, definition template schema 16 and constraint template schema 18 can be used to validate the structure and content of the templates 10, 12. In this manner, the techniques can reduce the chances of error by user 14.

Documents 19 represent electronic documents, files, scripts, communication streams, software objects, and the like, that contain metadata conforming to the data description language. More specifically, the metadata includes instances of elements belonging to the classes of elements defined by schema 8, or the sub-classes of elements defined by definition templates 10. Example languages include the Extensible Markup Language (XML), Extensible Style Language (XSL), Extensible Linking Language (XLL), Standardized Multimedia Authoring Language (SMIL), as well as variations of the Standard Generalized Markup Language (SGML).

Validation engine 17 validates documents 19 in accordance with virtual schema 6 generated by schema generator 4. In particular, validation engine 17 verifies that the instances of the elements within documents 19 comply with the classes of elements defined by base schema 6, the sub-classes defined by definition templates 10, and the constraints for the instances defined by constraint templates 12.

Advantageously, documents 19 comply with the base schema and, therefore, are normalized in the sense that the names and attributes of the elements are substantially similar. Accordingly, base schema 8 can be extended, and constraints can be introduced for fine-grain validation of documents 19, without requiring a complex schema in which the documents would otherwise lose normalization.

The following pseudocode illustrates an exemplary base schema, definition template and constraint template that may be used for capturing information related to reusable software assets. In particular, the following exemplary base schema defines a parent class of elements named ASSET, and two child classes of elements named KEYWORD and RELATION.

```
<XSD:SCHEMA >
    <XSD:ELEMENT NAME="ASSET">
        <XSD:ELEMENT NAME="KEYWORD" MINOCCURS="0"
        MAXOCCURS="UNBOUNDED">
            <XSD:ATTRIBUTE NAME="NAME"
            TYPE="XSD:STRING" USE="REQUIRED "/>
            <XSD:ATTRIBUTE NAME="VALUE"
            TYPE="XSD:STRING" USE="REQUIRED"/>
        </XSD:ELEMENT>
        <XSD:ELEMENT NAME="RELATION" MINOCCURS="0"
        MAXOCCURS="UNBOUNDED">
            <XSD:ATTRIBUTE NAME="ROLE"
            TYPE="XSD:STRING" USE="REQUIRED"/>
            <XSD:ATTRIBUTE NAME="ID"
            TYPE="XSD:ID" USE="REQUIRED"/>
            <XSD:ATTRIBUTE NAME="TYPE"
            TYPE="XSD:STRING" USE="REQUIRED"/>
        </XSD:ELEMENT>
        <XSD:ATTRIBUTE NAME="NAME"
            TYPE="XSD:STRING" USE="REQUIRED"/>
        <XSD:ATTRIBUTE NAME="TEMPLATE"
            TYPE="XSD:STRING" USE="REQUIRED"/>
    </XSD:ELEMENT>
</XSD:SCHEMA>
```

As shown below, the following exemplary definition template illustrates the definition of sub-classes for the classes of elements KEYWORD and RELATION, thereby extending the definitions provided by the above-listed exemplary base schema without conforming to an XML Schema Definition (XSD).

```
<TEMPLATE NAME="ASSET-DEFINITION-TEMPLATE" PARENT=
"ASSET-SCHEMA.XSD">
    <DEFINE-KEYWORD NAME="CATEGORY" TYPE="STRING">
        <ADD-VALUE VALUE="FINANCE"/>
        <ADD-VALUE VALUE="BANKING"/>
    </DEFINE-KEYWORD>
    <DEFINE-KEYWORD NAME="PRICE" TYPE="DECIMAL"/>
    <DEFINE-KEYWORD NAME="ALIAS" TYPE="STRING"/>
    <DEFINE-RELATION ROLE="USES" TYPE="ASSOCIATION"/>
    <DEFINE-RELATION ROLE="PREDECESSOR"
    TYPE="PREVIOUS-VERSION">
        <MAX-OCCURS VALUE="1"/>
    </DEFINE-RELATION>
</TEMPLATE>
```

The above-illustrated exemplary definition template makes use of elements DEFINE-KEYWORD and DEFINE-RELATION to define specific sub-classes for these respective classes of elements defined by the exemplary base schema. More specifically, for class KEYWORD, the exemplary definition template defines a sub-class CATEGORY having two possible values: FINANCE and BANKING The exemplary definition template defines two additional sub-classes for the class KEYWORD including PRICE and ALIAS. For the class RELATION, the definition template defines two sub-classes of USES and PREDECESSOR.

The following exemplary constraint template provides requirements for the use of, and constraints for, the instances of the elements without conforming to an XML Schema Definition (XSD).

```
<TEMPLATE NAME="ASSET-CONSTRAINT-TEMPLATE"
PARENT="ASSET-DEFINITION-TEMPLATE.XML">
    <USE-KEYWORD NAME="CATEGORY"/>
    <USE-KEYWORD NAME="PRICE">
        <MAX-OCCURS VALUE="1"/>
    </USE-KEYWORD>
    <USE-RELATION ROLE="PREDECESSOR"/>
    <USE-RELATION ROLE="USES">
        <MIN-OCCURS VALUE="1"/>
    </USE-RELATION>
</TEMPLATE>
```

The above-illustrated exemplary constraint template makes use of elements USE-KEYWORD and USE-RELATION to define specific requirements for instances for the sub-classes of elements defined by the definition template. More specifically, the exemplary constraint template 10 allows at least one instance of an element belonging to the sub-class CATEGORY. The exemplary constraint template further allows at most one instance of an element belonging to the sub-class PRICE. Similarly, the exemplary constraint template allows at least one instance of an element belonging to the sub-class PREDECESSOR, and requires at least one instance of an element belonging to the sub-class USES.

The following pseudocode illustrates an exemplary document that describes a reusable software asset, and which complies with the exemplary base schema, definition template, and constraint template listed above.

```
<ASSET NAME="BANKING-ASSET-2.0" TEMPLATE=
"ASSET-CONSTRAINT-TEMPLATE.XML">
    <KEYWORD NAME="CATEGORY" VALUE="BANKING"/>
    <KEYWORD NAME="PRICE" VALUE="100.00"/>
    <RELATION ROLE="USES" ID="CURRENCY-ASSET-4.1"
    TYPE="ASSOCIATION"/>
    <RELATION ROLE="PREDECESSOR"
    ID="BANKING-ASSET-1.0"
    TYPE="PREVIOUS-VERSION"/>
</ASSET>
```

Figure 2:
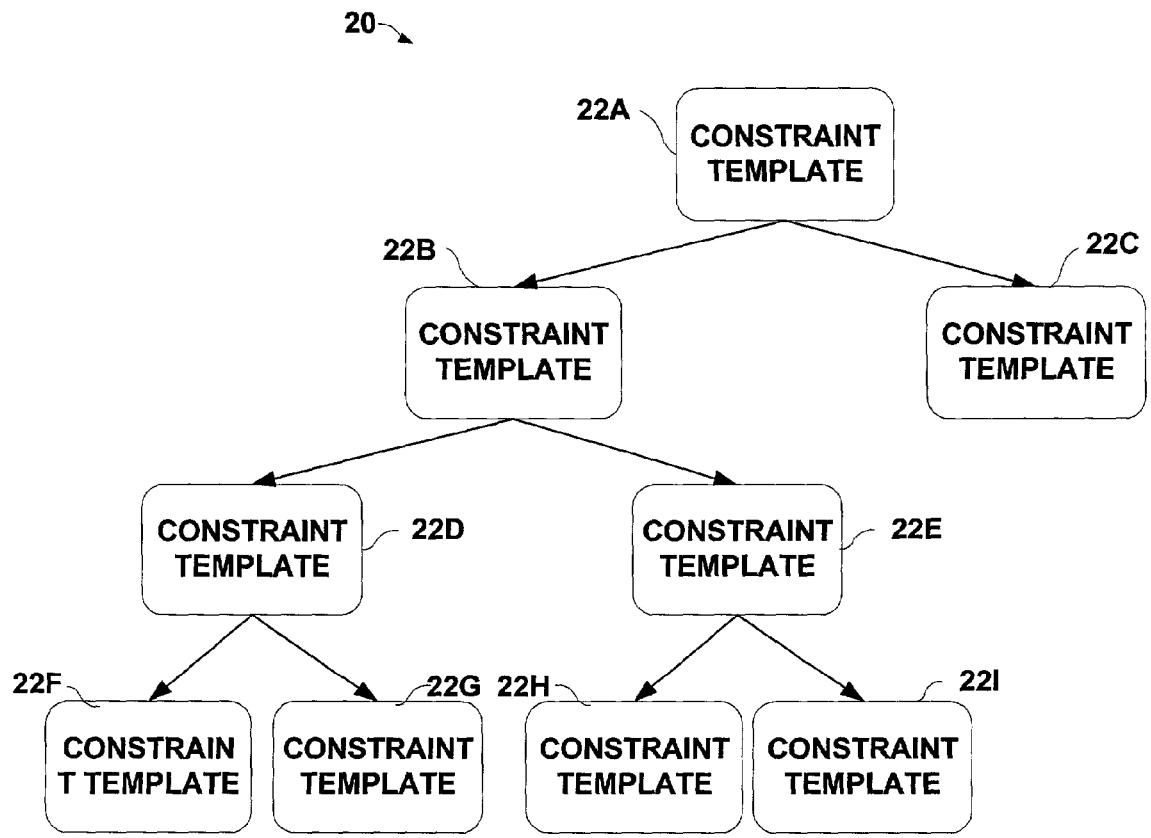
FIG 2 is a block diagram illustrating a hierarchy of constraint templates for use by the schema generator.

FIG. 2 is a block diagram illustrating a hierarchy 20 of constraint templates 22A–22I (herein constraint templates 22). Constraint templates 22 are arranged accordingly to parent/child relationships in which the child constraint templates include requirements that further limit the requirements defined by the parent constraint templates. For example, constraint template 22B is a child of constraint template 22A, and further limits the requirements defined by constraint template 22A. Similarly, constraint template 22D further limits the requirements defined by constraint template 22B.

To generate virtual schema 6, schema generator 4 can use any node of hierarchy 20, i.e., any of constraint templates 22. If constraint template 22F is used, for example, schema generator 4 applies the ancestor constraint templates 22A, 22B, 22D, and 22F to fully constrain the use of instances of element classes and sub-classes defined by base schema 8 and definition template 10. During the application of the constraint templates 22, schema generator 4 validates the constraint templates 22 against constraint template schema 16. In addition, schema generator 4 validates that each child constraint template applied does not conflict with any ancestor constraint template. For example, if a parent constraint template defines a minimum number of instances for an element, a child constraint template cannot define a lower minimum.

User 14 can easily configure system 2 to support a new class of XML documents by adding one or more constraint templates 22 to hierarchy 20. In this manner, constraint templates can readily be developed to support an entire enterprise by developing the templates in hierarchical fashion. Advantageously, all of the XML documents supported by hierarchy 20 conform to base schema 8, and are normalized in that the names and attributes of the elements are substantially similar.

Figure 3:
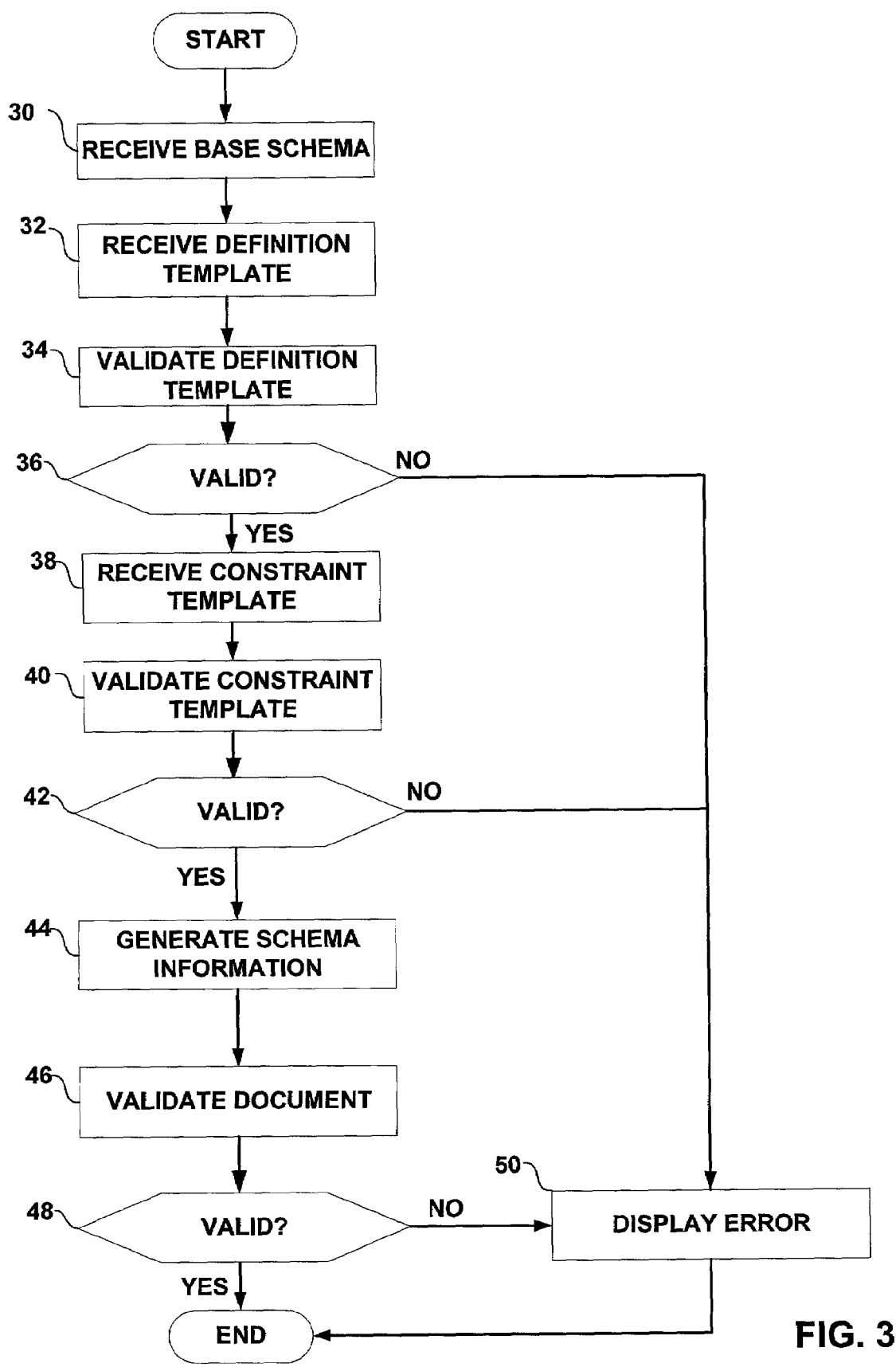
FIG. 3 is a flowchart illustrating in further detail the techniques for dynamically generating the schema information.

FIG. 3 is a flowchart illustrating in further detail the techniques for dynamically generating schema information. Initially, schema generator 4 receives a base schema 8 defining a class of elements that conform to a data description language (30). Next, schema generator 4 may receive any number of definition templates that define sub-classes for the elements (32). Upon receiving definition templates 10, schema generator 4 validates the definition templates using definition template schema 16 (36).

If schema generator 4 determines that any of the definition templates are not valid in view of definition template schema 16 (no branch of 36), schema generator 4 displays an error message to user 14 (50).

Otherwise, schema generator 4 receives any number of constraint templates 12 that define requirements for instances of the elements (38). As described above, the constraint templates 12 may be associated in hierarchical form. Upon receiving the constraint templates 12, schema generator 4 validates each constraint template using constraint template schema 18 (40). If schema generator 4 determines that any of the constraint templates 12 are invalid in view of constraint template schema 18 (no branch of 36), schema generator 4 displays an error message to user 14 (50).

Upon validating both definition template 10 and constraint template 12, schema generator 4 generates schema information, i.e., virtual schema 6 (44). In particular, schema generator 4 generates the schema information of virtual schema 6 by first generating a data structure representing the classes of elements defined by base schema 8. Schema generator 4 then applies definition templates 10 to base schema 8 to extend the schema information to include the sub-classes of elements defined within definition template 10. Finally, schema generator 4 applies the constraint templates 12 to update the schema information to include the restrictions defined by constraint templates 12. As described above, schema generator 4 may apply a hierarchy of constraint templates starting at a root constraint template and proceeding to a selected one of the constraint templates of the hierarchy.

In one embodiment, schema generator 4 generates virtual schema 6 as a data structure that defines permissible values and attributes for validating the instances of the classes and sub-classes. For every permissible element, the data structure generates a record that defines a name of the element, a list of valid values, a cardinality for the element, and a list of permissible attributes. The data structure further generates a record for each attribute that lists valid values for the attributes. Schema generator 4 may generate the data structure as a tree, hash table, linked list, and the like, or any combination thereof.

Validation engine 17 validates document 19 in accordance with virtual schema 6 (48). In other words, validation engine 17 verifies that the instances of the elements comply with the classes and sub-classes defined by base schema 8 and definition template 10, respectively, and the requirements defined by constraint templates 13. Similarly, if definition templates 10 are not provided, validation engine validates document 19 in accordance with virtual schema 6 generated from base schema 8 and constraint templates 12. If validation engine 17 determines that document 19 is invalid, validation engine 17 may display an error message to user 14 (50).

Figure 4:
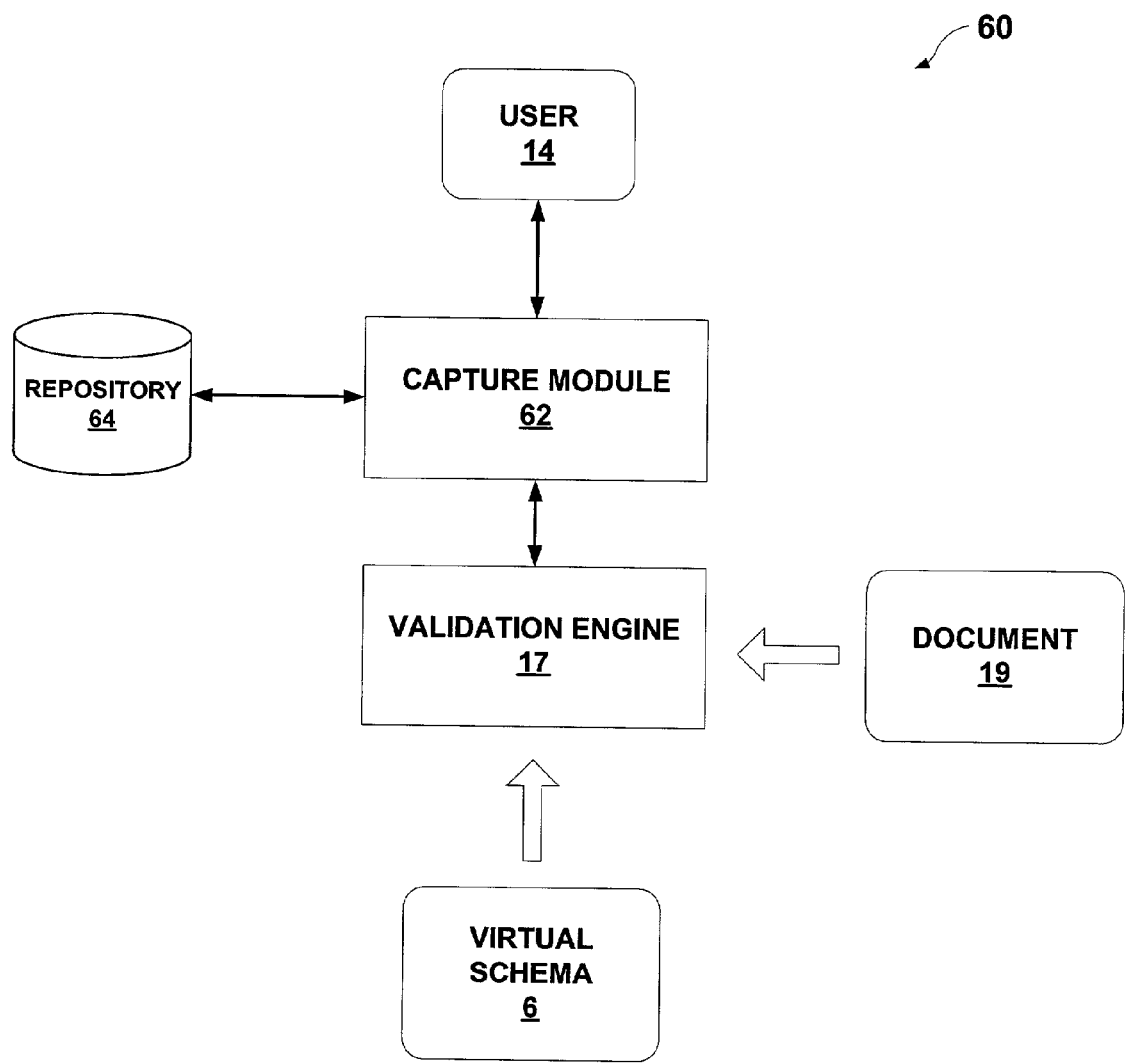
FIG. 4 is a block diagram illustrating a system in which a validation engine uses the virtual schema to drive a data capture process.

FIG. 4 is a block diagram illustrating a system 60 in which validation engine 17 uses virtual schema 6 to identify any of the required instances of the elements that are missing from document 19. Upon detecting missing instances, validation engine 4 invokes capture module 62 to capture data from the user 14 or repository 64. In this manner, validation engine 17 and capture module 62 may use the base schema 8, definition templates 10, and constraint templates 12 to drive a process for capturing and normalizing data, such as reusable software assets as illustrated in the examples above.

For example, the captured reusable software assets may comprise a set of related artifacts that have been created for the purpose of applying that asset repeatedly in subsequent development environments. Examples of artifacts include source code or binary code for the software asset. Other examples include documentation such as a requirements specification, design document, and the like. Additional examples of artifacts include independently deployable software components, such as Enterprise JavaBeans (EJB) and the Component Object Model (COM), schemas that conform to a data description language, modeling information (models) that provides formal representations of various software components, artifacts related to the deployment of the asset, such as particular instances of the software components.

Various embodiments of the invention have been described. These and other embodiments are within the scope of the following claims.

The invention claimed is:

1. A computer-implemented method comprising:
receiving a base schema defining one of more classes of elements that conform to a data description language;
receiving a constraint template that defines requirements for instances of the elements without conforming to an XML Schema Definition (XSD), wherein the constraint template conforms to a constraint template schema that is separate from the base schema;
receiving a definition template that defines a sub-class for the elements;
executing a schema generator on a computer system to generate schema information by:
  (i) executing the schema generator to dynamically generate a data structure representing the classes of elements defined by the base schema and applying the definition template to the base schema to extend the schema information to include the sub-classes of elements defined within definition template, and
  (ii) executing the schema generator to dynamically update the schema information to include the restrictions defined by constraint templates; and
executing a validation engine on the computer system to verify that instances of the elements within an XML document comply with the classes defined by the base schema, the sub-classes defined by the definition template, and the requirements defined by constraint template.

2. The computer-implemented method of claim 1,
wherein a first one of the instances of the XML document is a first one of the classes defined by the base schema, and
wherein executing a validation engine comprises:
verifying that the first one of the instances within the XML document conforms to the first one of the classes defined by the base schema, and
verifying that the first one of the instances complies with the requirements defined by the constraint template.

3. The method of claim 1, wherein the constraint template defines a required cardinality for the instances of the elements.

4. The method of claim 1, wherein the constraint template defines one of a required minimum and a required maximum number of the instances of the elements.

5. The method of claim 1, wherein the constraint template defines a range for a required number of the instances of the elements.

6. The method of claim 1, wherein the constraint template defines a required attribute for the instances of the elements.

7. The method of claim 1, wherein the constraint template defines a required parameter value for the instances of the elements.

8. The method of claim 1, wherein the constraint template defines specific required instances of the elements.

9. The method of claim 8, wherein executing a validation engine comprises executing the validation engine to identify any of the required instances of the elements that are missing from the XML document.

10. The method of claim 9, further comprising presenting an interface to a user to capture data for the missing required instances.

11. The method of claim 1, further comprising validating the constraint template according to the constraint template schema.

12. The method of claim 1, further comprising generating the constraint template based on input from a user.

13. The method of claim 1, further comprising generating the definition template based on input from a user.

14. The method of claim 1, wherein receiving a constraint template comprises receiving a hierarchy of constraint templates, and wherein executing a validation engine comprises executing the validation engine to validate the XML document in accordance with the hierarchy of constraint templates.

15. A computer system comprising:
a base schema defining a class of elements for reusable software assets that are repeatably used for software development environments, wherein the class of elements conform to a data description language;
a constraint template that defines requirements for instances of the elements without conforming to an XML Schema Definition (XSD), wherein the constraint template conforms to a constraint template schema that is separate from the base schema;
a schema generator executing on the computer system to dynamically generate a virtual schema based on the base schema and the constraint template; and
a validation engine executing on the computer system to validate an XML document with the virtual schema by verifying that instances of the elements comply with the classes defined by the base schema and the requirements defined by constraint template.

16. The system of claim 15, wherein the schema generator dynamically generates the virtual schema by dynamically generating a data structure to store schema information representing the schema, and updates the data structure to store additional schema information to represent the requirements defined by the constraint template.

17. The system of claim 15, wherein the constraint template defines a required cardinality for the instances of the elements.

18. The system of claim 15, wherein the constraint template defines one of a required minimum and a required maximum number of the instances of the elements.

19. The system of claim 15, wherein the constraint template defines a range for a required number of the instances of the elements.

20. The system of claim 15, wherein the constraint template defines a required attribute for the instances of the elements.

21. The system of claim 15, wherein the constraint template defines a required parameter value for the instances of the elements.

22. The system of claim 15, wherein the constraint template defines specific required instances of the elements.

23. The system of claim 22, wherein the validation engine identifies any of the required instances of the elements that are missing from the document.

24. The system of claim 23, further comprising a capture module to capture data for the missing required instances.

25. The system of claim 15, wherein the data description language comprises the extensible markup language (XML).

26. The system of claim 15, wherein the schema generator validates the constraint template according to the constraint template schema.

27. The system of claim 15, further comprising a definition template that defines a sub-class for the elements, wherein the validation engine validates the document in accordance with the definition template.

28. The system of claim 27, wherein the schema generator generates the virtual schema based on the base schema, the constraint template, and the definition template.

29. The system of claim 15, further comprising a hierarchy of constraint templates having at least one parent constraint template and at least one child constraint template, wherein the child constraint template includes requirements that further limits requirements defined by the parent constraint template, and wherein the validation engine validates the document in accordance with the child constraint template.

30. A computer system comprising:
a base schema defining a class of elements that conform to a data description language;
a definition template that defines a sub-class for the elements without conforming to an XML Schema Definition (XSD);
a constraint template that defines requirements for instances of the sub-class without conforming to an XML Schema Definition;
a schema generator executing on the computer system to generate a virtual schema based on the schema, the definition template, and the constraint template; and
a validation engine executing on the computer system to validate an XML document in accordance with the virtual schema.

31. The system of claim 30, wherein the virtual schema comprises a data structure to store schema information representing the schema, the sub-class, and the requirements.

32. The system of claim 31, wherein the schema generator dynamically generates the data structure.

33. The system of claim 30, wherein the constraint template and the definition template conform to the data description language.

34. The system of claim 30, wherein the constraint template defines specific required instances of the elements, and the validation engine identifies any of the required instances of the elements that are missing from the document.

35. The system of claim 34, further comprising a capture module to capture data for the missing required instances.

36. The system of claim 30, wherein the constraint template defines at least one of:
   a required cardinality for the instances of the elements,
   a required minimum and a required maximum number of the instances of the elements,
   a range for a required number of the instances of the elements,
   a required attribute for the instances of the elements, and
   a required parameter value for the instances of the elements.

37. The system of claim 30, wherein the constraint template conforms to the data description language.

38. A computer system comprising:
   a base schema defining a class of elements for reusable software assets that are repeatably used for software development environments, wherein the class of elements conform to a data description language;
   artifacts that have been created for the purpose of applying that asset repeatedly in subsequent development environments
   a constraint template that defines requirements for instances of the elements without conforming to an XML Schema Definition (XSD);
   a schema generator executing on the computer system to dynamically generate schema information for validating documents conforming to a data description language, wherein the schema generator generates the schema information from the base schema in accordance with the constraint template; and
   a validation engine executing on the computer system to validate information related to reusable software assets, wherein the validation engine uses the schema information to verify that instances of the elements within the information complies with the classes defined by the base schema and the requirements defined by constraint template.

39. A computer-readable medium comprising instructions to cause a processor to:
   receive a base schema defining a class of elements that conform to a data description language;
   receive a constraint template that defines requirements for instances of the elements, wherein the constraint template does not conform to an XML Schema Definition (XSD);
   dynamically generate schema information based on the base schema and the constraint template;
   receive an XML document having an instance of one of the elements defined by the base schema, and wherein the instance is of the class defined by the base schema and not a derived class;
   verify that the instance of the class conforms to the class as defined by the base schema; and
   verify that the instance complies with the requirements defined by the constraint template.

40. A computer system comprising:
   a base schema defining a class of elements that conform to a data description language;
   a hierarchy of constraint templates having at least one parent constraint template and at least one child constraint template that controls generation of additional schema information from the schema; and
   a schema generator executing on the computer system to dynamically generate schema information based on the base schema and the hierarchy of constraint templates,
   wherein the constraint templates define requirements fix instances of the elements without conforming to an XML Schema Definition (XSD), and the requirements of the child constraint template limit the requirements of the parent constraint template without conforming to an (XSD).

41. The system of claim 40, further comprising a validation engine executing on the computer system that validates a document in accordance with the schema information.

* * * * *

UNITED STATES PATENT AND TRADEMARK OFFICE
CERTIFICATE OF CORRECTION

| | | |
|---|---|---|
| PATENT NO. | : 7,200,805 B2 | |
| APPLICATION NO. | : 10/102189 | |
| DATED | : April 3, 2007 | |
| INVENTOR(S) | : Brent A. Carlson, Dave H. Gross and Timothy J. Graser | |

It is certified that error appears in the above-identified patent and that said Letters Patent is hereby corrected as shown below:

On the Title page item [75] of the patent, the city and state of all of the inventors listed should read --Rochester, MN (US)-- instead of "Rochester, NY (US)".

Signed and Sealed this

Ninth Day of September, 2008

JON W. DUDAS
*Director of the United States Patent and Trademark Office*